Nov. 17, 1936. W. A. HEINZE 2,061,153

HOUSED ARMORED GREASE RETAINER

Filed May 18, 1934

WILLIAM A. HEINZE
INVENTOR

PER *Albert J. Fihe*

ATTORNEY

Patented Nov. 17, 1936

2,061,153

UNITED STATES PATENT OFFICE 2,061,153

HOUSED ARMORED GREASE RETAINER

William A. Heinze, Chicago, Ill., assignor to Victor Manufacturing & Gasket Company, Chicago, Ill., a corporation of Illinois Application May 18, 1934, Serial No. 726,343

2 Claims. (Cl. 288—1)

This invention relates to an improved housed armored grease retainer, and has for one of its principal objects the provision of a grease retainer or oil seal which includes in a unitary structure, an armored leather or other packing element and a housing therefor, together with a spacer in the housing whereby the armored packing element is suitably positioned for use.

One of the important objects of this invention is the provision, in a housed armored grease retainer, of means for producing a substantially right-angle bend of the leather or other packing element, whereby contact over a considerable area will be had between the face of the leather packing and the corresponding rotating shaft to which the same is applied.

Another important object of the invention is to provide in a housed armored grease retainer, means for constricting the packing element into position about the shaft, which means may comprise either the usual garter spring, or, otherwise, an extension or accessory of the armor for the packing itself.

Another and still further important object of the invention is to provide an armored packing which can by itself be used as a grease retainer or oil seal in connection with a rotating shaft either with or without a containing housing so long as some means is provided for retaining the same in desired position with regard to said shaft.

A still further important object of the invention is to provide, in conjunction with an armored grease retainer, a housing for supporting the same in desired position with regard to a rotatable shaft and adjacent elements together with means in the housing for properly positioning the armored packing therein which means additionally acts as a reinforcement for the housing itself and provides against distortion or damaging of the same when the grease retainer is being fitted into desired position.

Other and further important objects of the invention will be apparent from the disclosures in the accompanying drawing and following specification.

The invention, in a preferred form, is illustrated in the drawing and hereinafter more fully described.

Figure 1:
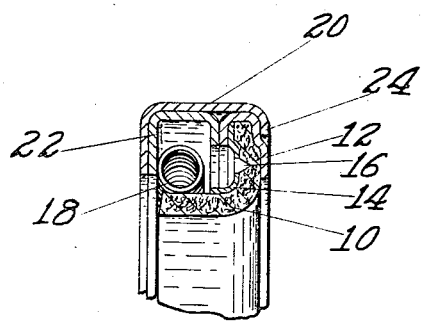
Figure 1 is a sectional view of an improved housed armored grease retainer constructed in accordance with the principles of this invention.

The reference numeral 10 (Figure 1) illustrates the packing element of this particular grease retainer, the same being preferably composed of leather or some other suitable material and which, in this as in all the other embodiments illustrated, is bent into such a shape that a section thereof will present an approximately right-angle structure as illustrated. One portion of this right-angle structure bears against a rotatable shaft about which the entire device is positioned, and the other section is clamped in an armor or auxiliary housing which, in the example shown in Figure 1, comprises essentially a sheet metal annular cup-shaped element 12 fashioned into somewhat U-shape as shown to grip the corresponding portion of the packing. One leg of the U is somewhat shorter than the other and is adapted to co-act with a somewhat thinner sheet metal plate 14 positioned against the inner face of the leather packing 10, and about the outer periphery of which this short leg of the element 12 is bent or die-pressed into clamping position.

Suitable inwardly struck tangs or prongs 16 are provided, these prongs being integral with the element 14 and penetrating the material of the leather packing 10 in such a manner as to prevent undesirable turning thereof in the armor or with respect to the housing proper.

A garter spring 18 is provided bearing against that portion of the packing 10 which contacts the rotating shaft, and this spring constricts the packing against the shaft in such a manner as to effectively prevent oil or grease leakage.

It will be noted that the auxiliary armored plate 14 is bent into substantially a right-angle, and thereby produces a right-angle contour of the leather packing 10 forcing a bending thereof at a desired point and thereby producing a much better surface contact with the shaft.

A supporting housing 20 is positioned about the armored leather assembly and spring, and in order that the armored structure may be properly positioned in the housing, a spacing or clamping element 22 in the form of an annular ring somewhat U-shaped in cross-section is provided as shown.

The edge of the outer housing 20 is spun down into contacting relationship with a countersunk portion of the armor structure 12 as best shown at 24, thereby providing a unitary tightly clamped retainer which can be readily placed in position about an automobile shaft or in any other desired mechanism. The combined spacing and reinforcing member 22, in addition to assuring of a desired positioning of the armored leather in the housing 20, also reinforces the face of the housing so that when the same is driven into position, it will not be distorted under the blows, and this element 22 further insures against an undesirable displacement of the armored packing structure 10—12 in the housing itself.

Figure 2:
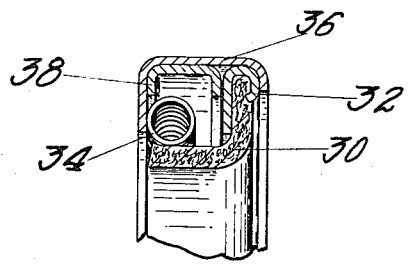
Figure 2 is a sectional view, showing a slight modification of the form of grease retainer illustrated in Figure 1.

In Figure 2 is shown a form of the invention wherein the leather packing 30 is clamped in a single armored sheet metal element 32 shaped as shown with its inner leg contacting a considerable portion of the corresponding inner face of the leather, thereby producing the desired right-angle bend of the leather at a suitable point. The usual garter spring 34, housing 36 and spacer 38 are provided.

Figure 4:
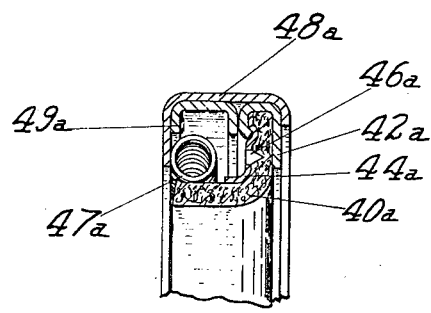
Figure 4 illustrates a slight change from the embodiment shown in Figure 3.
Figure 3:
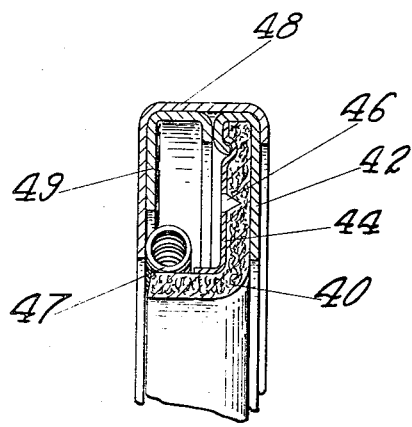
Figure 3 is a further sectional view, showing a modification slightly different from either of those illustrated in Figures 1 and 2.

In Figures 3 and 4, there is shown a leather packing element 40 and 40a mounted in armored structures 42 and 42a respectively, which armored structures include thin sheet metal reinforcing plates 44 and 44a having desired bends therein to produce suitable surface contact of the leather with its corresponding shaft and also having desired inwardly struck portions 46 and 46a to prevent undesirable shifting of the leather.

The usual garter springs 47 and 47a are provided together with outer housings 48 and 48a, and inner combined reinforcing elements 49 and 49a.

The only practical difference between the structures shown in Figures 3 and 4 is that of size, and both these structures are also quite similar to the embodiment illustrated in Figure 1 as will be apparent upon comparison.

Figure 5:
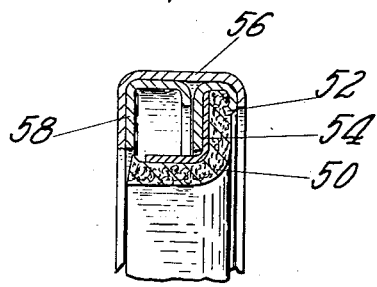
Figure 5 illustrates a still further modification somewhat similar to that shown in Figure 2, but wherein the garter spring is eliminated.

In Figure 5 is illustrated a modification of the invention wherein the leather packing 50 is mounted in an armor 52 which armor includes an L-shaped thin annular metal member 54 bent to produce the necessary or desired right-angle break in the leather itself and the legs of which are of substantially equal length, one leg being used to constrict the leather about the shaft, thereby eliminating the necessity of the garter spring. This leg can be made in the form of spaced fingers, if desired.

The usual housing 56 and corresponding spacer member 58 is provided.

Figure 6:
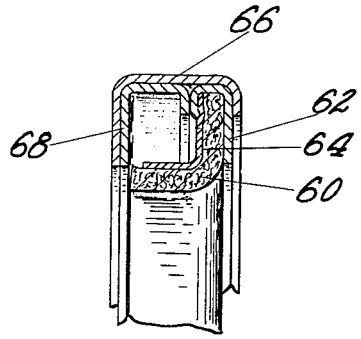
Figure 6 shows still another modification somewhat along the lines of that illustrated in Figure 5.

Figure 6 presents a slight modification of the embodiment shown in Figure 5 wherein a leather packing 60 is mounted in a U-shaped armor 62, the longer leg of which armor structure, however, is formed on the outer face of the retainer proper instead of on the inner face as shown in Figure 5. A thin auxiliary armored metal member is provided as shown at 64 having the usual right-angle bend and lateral extension adapted to constrict the leather about the shaft. There is also present the usual outer housing 66 and inner spacer and reinforcing element 68.

It will be seen that herein is provided a novel and comparatively inexpensive form of grease retainer which can be economically and simply produced and which is composed of a minimum of parts and which, furthermore, has the desired and requisite strength and relationship between the parts to provide an efficient properly operating device.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A grease retainer, including a housing, the housing including an annular cup-shaped outer shell, and an annular packing element for the shell, said packing element being L-shaped in cross section, a metallic armor encircling and gripping one flange of the packing, an auxiliary metallic armor element on that face of the packing opposed to the bottom of the cup and acting against the L-bend in the packing, a portion of said armor acting to form an outer wall of the housing when mounted in the shell, and an annular spacing element U-shaped in cross section in the shell for positioning the armored packing.

2. A grease retainer, including a housing, the housing including an annular cup-shaped outer shell, and an annular packing element for the shell, said packing element being L-shaped in cross section, a disk-like metallic armor encircling and having a peripheral flange gripping one flange of the packing, a portion of said disk acting to form an outer wall of the housing when mounted therein, a secondary armor element on that face of the packing opposed to the bottom of the cup, portions of said second armor being embedded in the packing, and an annular spacing element U-shaped in cross section in the shell for positioning the armored packing, and reinforcing the shell walls.

WILLIAM A. HEINZE.